2,904,272
REEL ASSEMBLY

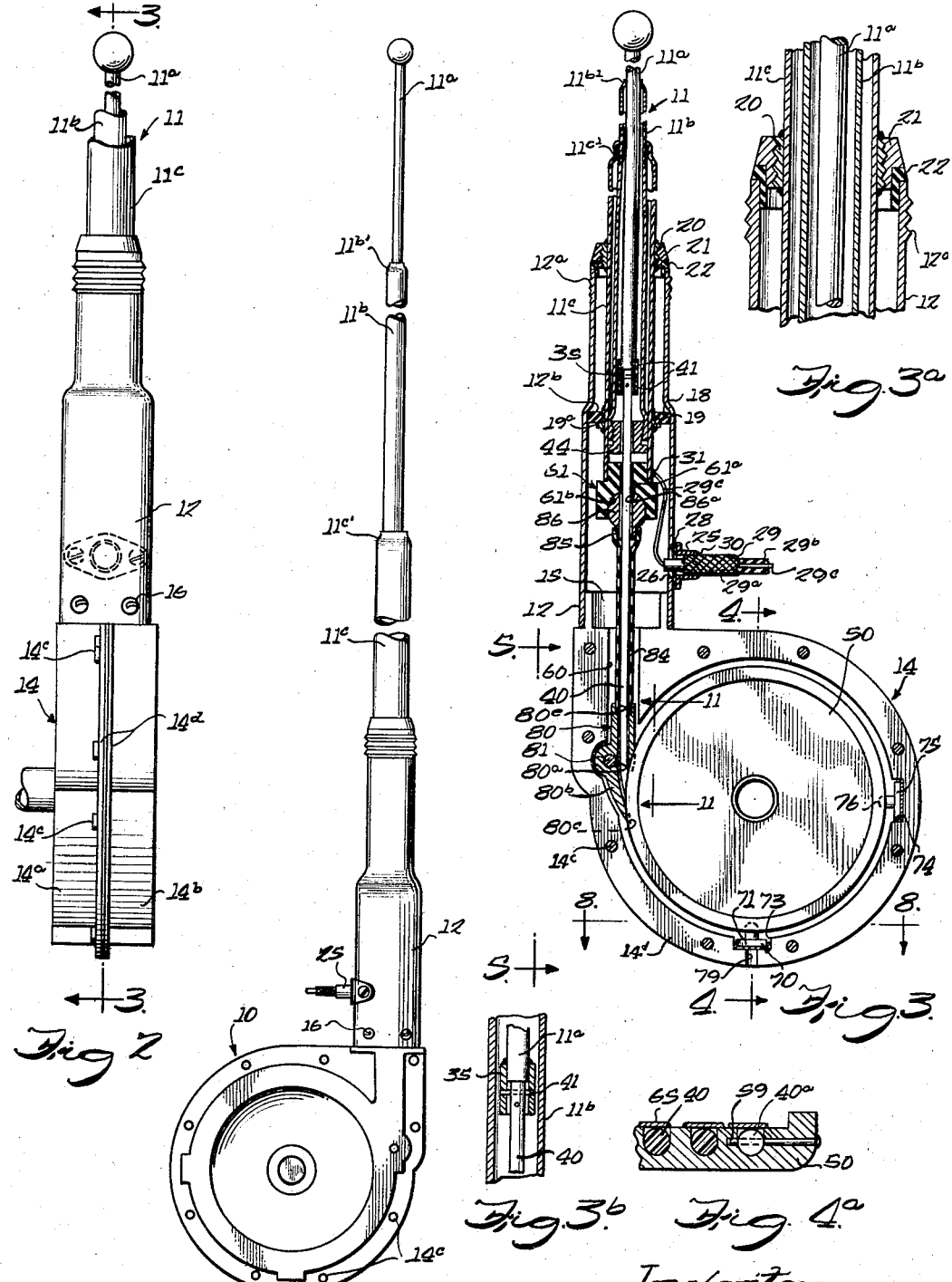

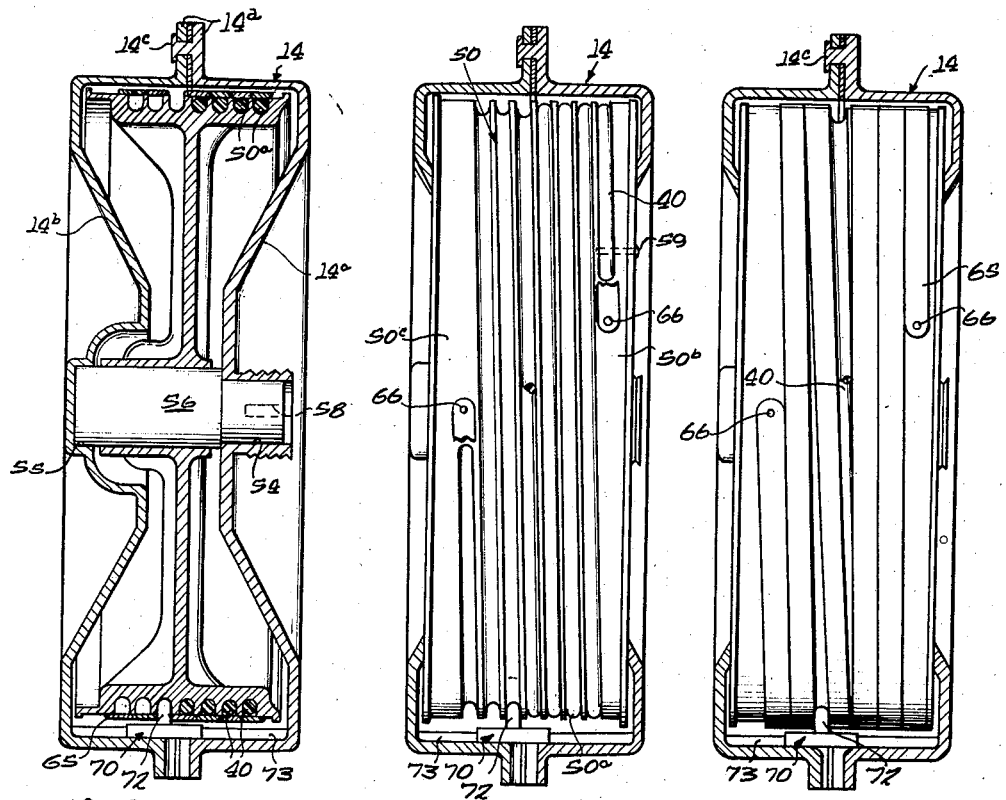

Edward L. Barrett, La Grange, Ill., assignor, by direct and mesne assignments, to John P. Henebry, Chicago, and Edward L. Barrett, La Grange, Ill.

Application February 18, 1955, Serial No. 489,037

10 Claims. (Cl. 242—54)

The present invention relates in general to reel assemblies and, in particular, to reels intended for use in a manner such that a flexible rod which is wound and unwound in response to rotation of a spool respectively pulls and pushes an object fastened to its free end.

It is the general aim of the invention to provide an improved reel of the foregoing type in which the flexible rod is completely constrained about a spool except at its point of exit or entry as the spool rotates, to thereby afford a pushing action resulting in compression in the rod without letting the latter spring away in loose coils from the spool.

An ancillary object is the provision of such a reel which is smooth and free in operation, and which greatly reduces wear on the flexible rod.

Another object is the provision of such a reel wherein the flexible rod is prevented from buckling at a location tangential to the spool so that it may exert a greater pushing force.

It is a further object to provide a novel reclosing means for self-opening rod confining means, thereby holding substantially all of the stored portion of the flexible rod on the spool and totally eliminating wearing rub of the element against a housing enclosing the spool.

Still another object is to provide a stop, for limiting winding action of a reel, which is operative on the spool rather than dependent upon tension or compression set up in the flexible rod as the latter is fully retracted.

Other objects and advantages will become apparent as the following description proceeds, taken in conjunction with the accompanying drawings, in which:

Figure 1 is a side elevation of a reel assembly embodying the features of the invention and shown, by way of example, in cooperative relation with a telescoping antenna which it serves to extend and retract;

Fig. 2 is a front elevation of the reel and antenna shown in Fig. 1;

Fig. 3 is a vertical section taken generally along the line 3—3 in Fig. 2;

Figs. 3a and 3b are enlarged detail views corresponding to parts of Fig. 3;

Fig. 4 is a detailed section of the reel assembly, being taken substantially along the line 4—4 in Fig. 3;

Fig. 4a is a fragmentary section of the spool showing how the flexible rod is anchored;

Fig. 5 is a fragmentary view looking along the line 5—5 with the housing and a confining ribbon removed;

Fig. 6 is similar to Fig. 5 but with the ribbon in place;

Fig. 7 is a perspective view of a preferred reclosing carriage;

Fig. 8 is a fragmentary detail view, taken generally along the line 8—8 in Fig. 3 and illustrating the reclosing carriage located in the housing;

Fig. 9 is a perspective view of a modified reclosing arrangement;

Fig. 10 is a fragmentary section showing the reclosing arrangement of Fig. 9 in the reel housing; and Fig. 11 is a detail view, partially in section taken substantially along the line 11—11 in Fig. 3, of the rod take-off and guide means.

Although the invention has been shown and is described in some detail with reference to a particular embodiment thereof, there is no intention that it thus be limited to such detail. On the contrary, it is intended here to cover all modifications, alternative constructions and equivalents falling within the spirit and scope of the invention as defined by the appended claims.

Referring now to the drawings, a reel assembly 10 embodying the features of the invention has been shown as employed to extend and retract a telescoping antenna 11 of the type commonly used on automobiles. By way of introduction to the invention, the exemplary antenna includes three telescoping sections 11a, 11b and 11c, the latter being rigidly supported in a shield tube 12 which extends tangentially from a reel housing 14 and which is adapted for mounting in an automobile body by external threads 12a. The lower end of the shield tube 12 is locked to a collar 15 on the housing 14 by a plurality of screws 16.

For giving insulated support to the lower antenna section 11c, the tube 12 is offset to provide a radial shoulder at 12b against which the upper side of an annular insulator 18 bears. The lower side of this insulator seats against the flange 19a of a bushing 19 fixed, as by welding, to the antenna section 11c. This prevents the latter from shifting upwardly relative to the shield tube. A second insulated support connection (Fig. 3a) is formed, and the mouth of the tube 12 sealed, by welding or otherwise fixing an externally threaded bushing 20 to the antenna section 11c. An annular nut 21 tightened downwardly on the bushing 20 compresses an insulating ring nested in the mouth of the shield tube, locking out dirt and moisture, drawing the flange 19a snugly against the insulator 18, and preventing downward shifting of the antenna section 11c relative to the tube 12.

Electrical connection is made to the antenna sections by a conventional lead-in arrangement, comprising a flanged neck 25 fixed in registry with an opening 26 in the tube 12 and sealed by a gasket 28. A sheathed cable 29 extends through the neck 25, its woven wire sheath 29a being soldered to the neck as at 30, and its insulation sleeve 29b being stripped within the tube 12 from the inner conductor 29c so that the latter may be soldered (as at 31) to the antenna section 11c.

For the purpose of extending and retracting the antenna sections, an elongated semi-flexible element, that is, a flexible rod 40, is fixed to the lower end of the inner antenna section 11a and wound into the reel assembly. Upon unwinding of the element 40, it forces the antenna tip 11a upwardly until a bushing 35 at its lower end engages the necked upper end 11b' of middle section 11b so that the latter is forced upwardly within the outer section 11c. Retraction of the antenna is produced by winding the rod 40 into the reel assembly 10 so that it progressively pulls the three sections into telescoped relation.

As illustrated best in Fig. 3b, the flexible rod 40 has its free end fixed to the lower extremity of the inner antenna section 11a by means of the bushing 35 and two small pins 41. The bushing 35 is telescoped over and soldered to the section 11a, and slidably fits within the section 11b. The rod 40 is inserted into the bushing to abut the lower end of the section 11a, the pins 41 being inserted transversely through the bushing and the rod at axially spaced locations.

To complete the antenna assembly, the middle section 11b is flared and tapped at its lower end to receive a threaded sleeve 44. The latter has a central bore at 44a just slightly oversize relatively to the rod 40 and through which the rod slidably extends. Engagement of the lower flared end of the section 11b with the upper necked portion 11c' of the stationary section 11c limits the relative extension of the two parts, while abutment of the lower flared end of the section 11b against the sleeve 44 limits the contraction of the middle section within the lower section 11c.

The reel assembly 10, in the exemplary form, includes a spool 50 (Fig. 5) of generally cylindrical shape which is adapted to receive the rod 40 coiled in a helix thereon. Preferably, a helical groove 50a is formed in the surface of the spool. Means are provided to rotatably support the spool, in this instance a housing 14 which not only journals the spool but protectively surrounds it. The housing 14 may conveniently be formed as two half shells 14a, 14b fastened together by a plurality of rivets 14c inserted through matching flanges 14d. The shells 14a, 14b may be, for example, die castings formed to provide two internal bearings 54, 55 (Fig. 4) which rotatably receive a shaft 56, in turn supporting the spool 50. One end of the shaft is notched or keyed as at 58 to receive a tongued shaft or cable (not shown) rotatable in opposite directions by a suitable motor or hand crank (not shown) to thus turn the spool and wind or unwind the rod 40. The latter is anchored at its inner end 40a to the spool 50 by a headed pin 59 (Fig. 4a) pressed through a hole in one edge of the spool and the adjacent ridge which forms one end portion of the groove 50a. From this end, the rod 40 is wound and lies in the helical groove 50a, its other end being fastened, as explained, to the antenna section 11a.

While the housing 14 is generally cylindrical in shape, it includes an exit portion 60 (Fig. 3) extending substantially tangentially to the spool 50 and communicating with the tube 12. This permits extension and retraction of the flexible rod to control the telescoping of the antenna sections. The free end of the flexible rod is threaded through the exit portion 60 of the housing and through a central bore 61a in an insulating block 61 for connection to the antenna section 11a.

The term "flexible rod" used herein is intended to define any elongated element which is sufficiently flexible to be susceptible of winding on a spool, yet which is sufficiently stiff to withstand longitudinal compressive forces of reaction when the spool is unwound to push an object (such as the antenna section 11a) away from the reel assembly or when the object is pushed toward the reel to cause winding of the same. The flexible rod 40 is, moreover, capable of withstanding reasonable tensile forces so that it may pull the object (the antenna section 11a) back toward the reel assembly 10 as the spool 50 is rotated in a winding direction. While various materials, such as steel cables, may be used for the flexible rod 40, it has been found in antenna installations of the type illustrated, where the antenna must remain insulated from the automobile frame, that a heavy filament of nylon approximately 0.10 inch in diameter serves very satisfactorily.

In reels of this type where the flexible rod is to exert pushing as well as pulling forces as it is respectively unwound and wound on a spool, the problem arises of confining the rod, when under longitudinal compression, around the spool and preventing it from expanding and buckling in loose loops. For example, even under normal conditions there is sufficient friction between the sections 11a—11c so that any attempt to unwind the rod 40 would simply cause the turns to expand and snub against the inner wall of the housing. The result is an unwanted locking action. Even if the torque applied to the shaft 56 and spool 50 were sufficiently great to overcome the frictional resistance, the expanded rod 40 in rubbing contact with the housing would be quickly destroyed. Thus if a housing is not employed, the rod might fall in loose loops off of the spool, and even if a housing is employed the rod will snub against it with such frictional force as to be completely ruined.

In accordance with the invention, the flexible rod is confined in a novel fashion so that it can neither (a) loosen or expand from the spool, nor (b) buckle at the region of exit even when under relatively great lengthwise compressive forces of reaction as the spool is rotated to extend the antenna.

For the first purpose, a ribbon-like covering member is wound about the spool and fixed to rotate therewith with the covering turns arranged in edgewise abutment to confine the flexible rod. The covering turns, however, have freedom to separate to permit the rod to leave or enter the groove 50a tangentially as the spool is rotated.

As here illustrated, such a covering member is embodied in the form of an elongated strip or ribbon 65 of resilient material, preferably spring bronze, steel, or a similar metal. The ribbon is wound helically around the spool 50, its opposite ends being pinned as at 66 (Fig. 5) to the end lands 50b, 50c of the spool 50. The axial distance between the two pins 66 on the spool 50 is such that any two adjacent convolutions of the ribbon may yieldably separate to leave an opening through which the flexible rod 40 passes into the exit portion 60, with the remaining convolutions of the ribbon being held closely edge-to-edge (Fig. 4). Rounded edges for the ribbon 65 assure that the rod is not cut or appreciably worn in sliding between adjacent convolutions.

With the covering ribbon 65 so disposed, its adjacent convolutions are successively spread apart as the flexible rod 40 is unwound from the spool 50. This provides an opening which helically progresses around and axially along the spool 50 during the winding or unwinding operation.

In accordance with one of the important aspects of the invention automatic reclosing means are provided adjacent the point of exit of the rod for maintaining the remaining portion of the rod closely confined. For this purpose, the reclosing means include a projection which is inserted between adjacent convolutions of the ribbon 65 and into the groove 50a at a point trailing the rod opening in the ribbon as the rod is being unwound. The projection is mounted to move axially of the spool by "threaded" engagement in the groove. Thus, in spreading apart adjacent convolutions of the ribbon opposite a vacant portion of the spool, the projection progressively recloses the rod opening.

In the present case, such reclosing is accomplished by providing a reclosing member or follower 70 which is arranged to slide axially in the housing. The reclosing member includes a disc-shaped carriage 71 having a short upwardly extending pin 72 and slidable in a channel 73 formed in the inside of the housing. The pin 72 (Figs. 4—6) is inserted between adjacent convolutions of the ribbon 65 and into "threaded" engagement with the spool groove 50a. Preferably, the pin 72 is disposed in an empty end portion of the groove 50a when the rod 40 is fully wound upon the spool, and at a point which trails by about 90° the exit and entry point of the rod from and to the groove 50a. Thus, as the spool 50 is driven to unwind the rod 40, and to extend the antenna 11, the pin 72 threadably rides in the groove 50a so that the carriage 71 is shifted axially in the housing channel 73 and retains its 90° trailing relation with the exit point of the rod 40. It will thus be seen that the pin 72 shifts axially in the housing but not circumferentially. In spreading convolutions of the ribbon 65 between which the rod 40 has previously passed into the exit portion 60, the pin 72 keeps the opening in the strip 65 for the rod 40 at a minimum necessary to permit exit or entry of the latter to and from the groove 50a; the pin thus automatically recloses the rod opening through the strip 65 as it helically progresses around the rotating spool, and prevents the initial turn of the rod from expanding under compressive forces into rubbing engagement with the inner surface of the housing 14.

This action may be augmented by providing still another reclosing device trailing 180° from the exit and entry point of the flexible rod 40 from and to the groove 50a. As shown best in Fig. 3, a second axial channel 74 is defined in the inner surface of the housing 14, slidably supporting a second carriage 75 having a pin 76 projecting between adjacent convolutions of the ribbon 65 and into the groove 50a. The combined action of the two pins 72, 76 spreads adjacent ribbon convolutions at an axial location where the flexible rod has already been removed from the groove, and thus assures that the separation of the ribbon convolutions by the flexible rod is only sufficient to permit exit or entry from or to the groove 50a. Expansion of the first turn of the rod 40 into rubbing engagement with the housing is therefore prevented.

As an alternative, modified reclosing devices 70a may be constructed as shown in Figs. 9 and 10. In this form, the carriage 71a is shaped generally in the form of an inverted U, and slides within a channel insert 78 fixed in the housing channel 73. A pin 72a on the carriage 71a projects between adjacent convolutions of the resilient ribbon 65 and into the groove 50a to provide the reclosing action described above. In both cases a drain hole 79 is preferably formed in the bottom portion of the housing 14, as here shown in the channel 73, to permit escape of any moisture which might condense within the assembly.

In reel assemblies of the type here considered, the additional problem exists of preventing the free end of the flexible rod 40 from tearing free of the object it pushes and pulls, e.g., the antenna section 11a. After the antenna 11 has been fully retracted, continued winding torque applied to the spool 50 by a driving motor or hand crank might easily rip the thin rod 40 away from the fastening pins 41.

The reclosing devices, in addition to the function described, obviate this difficulty. The groove 50a in the spool 50 is made three quarters of a turn longer than necessary to store the rod 40 when the antenna 11 is fully retracted. The pin 72 or 72a, as the case may be, abuts the end of the groove 50a when the rod is fully wound in, thereby providing a positive mechanical stop to prevent further winding rotation of the spool. As a result, undue tension in and ripping of the rod 40 from the pins 41 cannot occur.

While the construction described serves to constrain the flexible rod 40 about the spool 50, the problem exists of keeping the rod from buckling under longitudinal compression in the straight exit portion 60 of the housing 14, and in the shield tube 12. This is solved by providing in the exit portion 60 an apertured guide through which the flexible rod 40 slides and which floats axially as the element is stripped from or wound into different axial portions of the groove 50a.

In the illustrated form (Figs. 3 and 11) a guide member 80 has the flexible rod 40 threaded through a narrow aperture 80a, and is slidably mounted on a pin 81 fixed in the housing and running parallel to the axis of the spool 50. The guide member 80 thus slides back and forth on the pin 81 in the exit 60 as the rod 40 is unwound from or wound into different axial parts of the groove 50a. A tail 80b depending from the guide member has its inner face 80c curved to match and slidably ride over the outer surface of the ribbon 65, covering the space between adjacent convolutions of the latter on either side of the point where the rod 40 passes between those adjacent convolutions. The rod 40 is by this means smoothly guided, even when under compression, into the aperture 80a.

For confining the rod 40 against buckling in the region between the slidable guide member 80 and the stationary insulating block 61, a guide sleeve 84 is disposed between a cup-like seat 80c and a neck 85. The sleeve 84 is preferably flexible to accommodate the movement of the guide member 80, but reasonably stiff to preclude reverse bending when the rod 40 is under considerable lengthwise compression. The sleeve is thus desirably made of hard rubber or plastic. Its internal diameter is only slightly greater than the external diameter of the rod 40 so that it serves to constrain the rod against buckling under reaction compressive forces.

In order to permit the lower end of the sleeve 84 to swing with the guide member 80 as the latter slides on the pin 81, but without reversely bending, a swivel connection is made between the upper end of the sleeve and the insulating block 61. As here shown, the latter block is formed with a spherical cavity 61b leading into the bore 61a. A metal ball or sphere 86, integral with the neck 85, is disposed in the cavity and provided with a flared passage 86a leading into the bore 61a. The sphere 86a rocks in the cavity 61b as the lower end of the sleeve swings with the guide member 80. The rod 40 is thus constrained against buckling under lengthwise compression and is able to exert a considerably greater pushing force on the antenna section 11a as the spool 50 is unwound.

It is believed that the foregoing description makes clear the operation and advantages of the present reel assembly. It will be understood that the flexible rod 40 is completely constrained against expanding from the storage spool 50 or buckling in the exit portion 60 as the spool is unwound. The flexible rod freely leaves and enters the groove 50a of the storage spool by yieldably separating adjacent convolutions of the resilient ribbon 65. However, the latter is immediately reclosed by the following pins 72, 76 so that, at most, the rod can expand only into contact with the covering strip. But this covering ribbon produces no friction by virtue of the fact that it rotates with the spool and the stored portion of the rod. The pins 72, 76 which shift axially along the spool and follow the exit point of the rod 40 from the groove assure that only the minimum necessary separation occurs in the covering ribbon 65 at the region where the stored portion of the rod remains on the spool. Smooth guiding of the element into the fixed bore 61a of the insulating block 61 is assured by the guide member 80 which shifts axially on its support pin 81 as winding or unwinding progresses. This axial shifting coupled with the confining action of the sleeve 84 swiveled by the sphere 86 assures that the flexible rod cannot buckle under the most severe compressive forces. Completely trouble-free and smooth operation is thus achieved.

I claim:

1. A reel assembly comprising, in combination, a cylindrical spool having a helical groove formed in its surface, a cylindrical housing having a tangentially extending exit portion, means supporting and journaling said spool within said housing with freedom for rotation but fixed against axial movement relative to said housing, an elongated flexible rod anchored at its one end to said spool and lying in said groove, the other end of said rod extending through said exit portion and adapted to be extended and retracted as said spool is rotated in opposite directions, a flat, elongated resilient ribbon made fast at its ends to and wound spirally about said reel in covering relation to said groove and rod, adjacent convolutions of said ribbon being yieldably separable to afford exit and entry of said rod from and to said groove, a plurality of pins slidably projecting into said groove, means mounting said pins in said housing wall at circularly spaced points for axial following movement producing progressive reclosing of adjacent convolutions of said ribbon spread by said rod as the spool is rotated, an apertured guide member through which said rod is threaded, means mounting said guide member in said housing exit portion for sliding reciprocation parallel to the axis of said spool, whereby a compressive force of reaction may be withstood by the rod as it is unwound from the spool, the ribbon and the guide member preventing snubbing of the rod against the housing walls.

2. A reel assembly comprising, in combination, a spool having a helical groove formed in its surface, a substantially cylindrical housing surrounding and journaling said spool and having an exit portion substantially tangential to said spool, an elongated flexible rod anchored at its one end to said spool and lying in said groove with its other end extending through said exit portion, a resilient ribbon helically wound with edgewise contact of adjacent convolutions around said spool in covering relation to said groove and rod to prevent expansion of the latter under longitudinal compression into rubbing contact with said housing, said rod progressively separating adjacent convolutions of said ribbon at the point of exit or entry from and into said groove as the rod is wound and unwound from said spool, a follower pin mounted for axial movement along the housing and projecting into the groove at a point trailing the exit point of said rod so as to spread adjacent convolutions of said ribbon and reclose the convolutions of the strip opened by said element, an apertured guide member through which said rod is threaded, and means mounting said guide in the exit portion of said housing with freedom for sliding movement parallel to the axis of the spool to prevent buckling of the rod as it is unwound by the rotation of the spool.

3. A reel assembly comprising, in combination, a spool having a helical groove in its surface, a housing surrounding said spool and having an exit, a flexible rod fast at one end to said spool and wound in said groove and extending through said exit, said spool being adapted for driven rotation in opposite directions to extend and retract said rod through said exit, a resilient ribbon helically wound and fixed in covering relation to said groove and rod on said spool, adjacent convolutions of the ribbon being yieldingly separable in an axial direction as said rod is wound or unwound onto or from the spool, means including a pin projecting into said groove for progressively closing convolutions of the ribbon separated by said rod as the latter is unwound, and an apertured guide member slidable axially along said housing in the exit thereof, said rod being threaded through the aperture of said guide member.

4. In a reel assembly for storing means to linearly push and pull an object as such means are unwound and wound, the combination comprising a cylindrical spool adapted to be rotationally driven in either direction and having a helical groove in its surface, a flexible rod fast at one end to said spool and lying in said groove, a housing journaling said spool and having an exit tangential thereto through which the other end of said rod passes, an elongated, flat ribbon of resilient metal helically wound and fast on said spool in covering relation to said groove and rod, said ribbon being wound with sufficient axial looseness to permit at least two adjacent convolutions to spread for exit and entry of said rod to and from said groove while the remaining convolutions remain in edge-to-edge contact, whereby the ribbon confines the wound portion of said rod against loosening on said spool and permits the rod to push an object as the spool is rotated in an unwinding direction.

5. In a reel assembly for storing a flexible rod adapted to push as well as pull an object as it is unwound and wound, respectively, the combination comprising a spool adapted to be rotated in either direction and having a helical groove in its surface, a flexible rod fast at one end of and lying in said groove, a housing surrounding said spool and having an exit through which said rod may pass, and a resilient, flat, elongated ribbon made fast at its opposite ends to said spool and helically wound to cover said groove and rod, the axial distance between anchor points for said ribbon being greater by an amount substantially equal to the thickness of said rod than the axial distance which would be occupied if all its adjacent convolutions were in tight edgewise engagement, the rod thereby progressively and yieldably spreading adjacent convolutions of said ribbon as it is wound and unwound into said groove, loosening of the rod on the spool until it snubs the housing when being unwound being precluded by said ribbon.

6. In a reel assembly, the combination comprising a housing, a rotatable spool journaled in said housing, a flexible rod fast at one end of the spool and wound helically therearound, a resilient ribbon helically wound about and fast at its opposite ends on the spool in covering relation to said rod but with limited freedom for axial separation of its adjacent convolutions as said rod exits and enters therethrough, means defining an axial channel in said housing, a carriage, means slidably supporting said carriage in said channel adjacent the spool and with freedom for axial movement therealong, a projection on said carriage extending between adjacent convolutions of said ribbon at a point trailing the exit and entry point of said rod.

7. The combination set forth in claim 6 further characterized in that said projection is located approximately 90° around the spool groove from the point of exit of the flexible element, and a second channel in the housing, a second carriage, and a second projection are located approximately 180° around the groove from such point of exit.

8. The combination set forth in claim 6 further characterized in that said projection is located so as to engage the end of said groove when the rod is fully wound upon the spool, thereby providing a stop to prevent further winding rotation of the spool.

9. In a reel assembly including a rotatable spool and a flexible rod adapted to be wound and unwound thereon, means for guiding said rod and preventing its buckling in a region tangential to said spool comprising, in combination, an apertured guide member through which said rod is threaded, means for supporting said guide member adjacent the spool with freedom to slide axially therealong as the rod enters or leaves different axial points along the spool, a bored block fixed in spaced relation to said guide member and having said rod threaded therethrough, and a flexible sleeve coaxially surrounding said rod and fixed at its opposite ends to said guide member and block to constrain the rod against buckling in the region between the guide member and the block.

10. The combination set forth in claim 9 further characterized in that said sleeve is made of a relatively stiff though flexible plastic and is swivel-connected to the block by a ball joint to prevent reverse bending of the sleeve.

References Cited in the file of this patent

UNITED STATES PATENTS

| 2,343,684 | Mace | Mar. 7, 1944 |
| 2,344,490 | Brach | Mar. 21, 1944 |
| 2,621,863 | Nagel | Dec. 16, 1952 |

FOREIGN PATENTS

| 665,033 | Germany | Sept. 12, 1938 |
| 828,908 | Germany | Jan. 21, 1952 |